(12) United States Patent
Evans et al.

(10) Patent No.: US 8,394,287 B2
(45) Date of Patent: *Mar. 12, 2013

(54) NON-AQUEOUS HEAT TRANSFER FLUID AND USE THEREOF

(75) Inventors: John W. Evans, Sharon, CT (US); J. Thomas Light, Lakeville, CT (US)

(73) Assignee: Evans Cooling Systems, Inc., Sharon, CT (US)

( * ) Notice: Subject to any disclaimer, the term of this patent is extended or adjusted under 35 U.S.C. 154(b) by 1191 days.

This patent is subject to a terminal disclaimer.

(21) Appl. No.: 09/935,982

(22) Filed: Aug. 23, 2001

(65) Prior Publication Data

US 2003/0071242 A1 Apr. 17, 2003

Related U.S. Application Data

(63) Continuation-in-part of application No. 09/910,497, filed on Jul. 19, 2001.

(51) Int. Cl.
C09K 5/10 (2006.01)
C09K 5/20 (2006.01)
(52) U.S. Cl. .......... 252/68; 252/67; 252/71; 252/73
(58) Field of Classification Search .......... 252/71, 252/73, 67, 68; 514/1
See application file for complete search history.

(56) References Cited

U.S. PATENT DOCUMENTS

| | | | |
|---|---|---|---|
| 4,117,214 A | 9/1978 | Parks et al. | 427/220 |
| 4,382,870 A | 5/1983 | Abel et al. | 252/75 |
| 4,452,715 A | 6/1984 | Hirozawa | 252/75 |
| 4,455,248 A | 6/1984 | Wood | 252/75 |
| 4,545,925 A | 10/1985 | Bosen et al. | 252/389 |
| 4,550,694 A | 11/1985 | Evans | 123/41.02 |
| 4,561,990 A | 12/1985 | Darden | 252/75 |
| 4,630,572 A | 12/1986 | Evans | 123/41.21 |
| 4,698,172 A | 10/1987 | Tye et al. | 252/70 |
| 4,699,726 A | 10/1987 | Nolin et al. | 252/75 |
| 4,717,495 A | 1/1988 | Hercamp et al. | 252/75 |
| 4,728,452 A * | 3/1988 | Hansen | 252/75 |

(Continued)

FOREIGN PATENT DOCUMENTS

EP 0 369 100 A1 5/1990
EP 0 552 988 A1 7/1993

(Continued)

OTHER PUBLICATIONS

Chemistry The Central Science, Brown and Lemay, 4th ed., pp. 547-549, 1988.*

(Continued)

*Primary Examiner* — Gregory Delcotto
(74) *Attorney, Agent, or Firm* — McCarter & English LLP

(57) ABSTRACT

A non-aqueous, reduced toxicity polyhydric alcohol based heat transfer fluid is provided comprised of at least one polyhydric alcohol that acts as an ADH enzyme inhibitor, such as for example propylene glycol, thereby reducing the toxicity of ethylene glycol if ethylene glycol. The heat transfer fluid may also include corrosion inhibitors that are soluble in the polyhydric alcohols used for the heat transfer fluid. The heat transfer fluid may be used as a coolant in internal combustion engines such as automobile engines, a coolant for cooling electrical or electronic components, as a heat transfer fluid for solar energy heating systems, or a heat transfer fluid for maintaining temperatures in industrial processes. A low toxicity preparation fluid for absorbing water from heat exchange systems prior to installation of the heat transfer fluid is also provided that is comprised of ethylene glycol and at least one polyhydric alcohol, preferably propylene glycol, that acts as an ADH enzyme inhibitor.

7 Claims, 8 Drawing Sheets

U.S. PATENT DOCUMENTS

| | | | |
|---|---|---|---|
| 4,743,393 A | 5/1988 | Hirozawa | 252/75 |
| 4,758,367 A | 7/1988 | George | 252/75 |
| 4,759,864 A | 7/1988 | Van Neste et al. | 252/75 |
| 4,946,616 A | 8/1990 | Falla et al. | 252/75 |
| 4,978,469 A | 12/1990 | Seaman, Jr. | 252/170 |
| 5,085,791 A | 2/1992 | Burns | 252/79 |
| 5,085,793 A | 2/1992 | Burns et al. | 252/79 |
| 5,118,434 A * | 6/1992 | Meyer et al. | 252/70 |
| 5,240,631 A | 8/1993 | Mascioli et al. | 252/75 |
| 5,273,673 A | 12/1993 | Ashrawi et al. | |
| 5,366,651 A * | 11/1994 | Maes et al. | 252/76 |
| 5,385,688 A | 1/1995 | Miller et al. | 252/73 |
| 5,422,026 A | 6/1995 | Greaney | 252/73 |
| 5,591,375 A | 1/1997 | Lott et al. | 252/70 |
| 5,651,916 A | 7/1997 | Weir | 252/74 |
| 5,811,025 A | 9/1998 | Kawai et al. | 252/70 |
| 5,817,252 A | 10/1998 | Hu et al. | 252/70 |
| 5,935,488 A | 8/1999 | Wiesenfeld et al. | 252/70 |
| 5,997,763 A | 12/1999 | Pabon, Jr. et al. | 252/79 |
| 6,143,243 A | 11/2000 | Gershun et al. | 422/13 |
| 6,228,283 B1 | 5/2001 | Turcotte et al. | 252/76 |
| 7,655,154 B2 * | 2/2010 | Evans et al. | 252/73 |
| 2004/0099839 A1 | 5/2004 | Evans | |

FOREIGN PATENT DOCUMENTS

| | | | |
|---|---|---|---|
| EP | 0 552 988 B1 | 7/1993 | |
| EP | 0 555 022 A1 | 8/1993 | |
| EP | 0 761 797 A2 | 3/1997 | |
| EP | 0 761 797 A3 | 3/1997 | |
| JP | 55-125181 | 9/1980 | |
| JP | 03-031388 | 2/1991 | |
| JP | 08-183950 | 7/1996 | |
| WO | WO 89/09806 | 10/1989 | 252/74 |
| WO | WO95/07323 | 3/1995 | |
| WO | WO96/37570 | 11/1996 | |

OTHER PUBLICATIONS

Chen, "Antidotes for Methanol and Ethylene Glycol Poisonings", Chin Med Journal 1998; 61:S14.

Zadrozny, A.J., "Propylene Glycol Coolant: A Safer Alternative for Heavy Duty Vehicles", Society of Automotive Engineers, Inc. 1993.

Translation of Official Action in Japanese Patent Application No. 2002-512315.

The Penray Companies, Inc.; "Cooling System TechFacts—Fill-For-Life", http://www.penray.com/coolingtechfacts/.

*Handbook of Chemistry and Physics*, 42$^{nd}$ edition, The Chemical Rubber Publishing Co., pp. 992, 993, 1016, 1017.

Hercamp, et al., "Aqueous Propylene Glycol Coolant for Heavy Duty Engines." SAE Technical Paper Series, pp. 47-77, International Congress and Exposition Feb. 26-Mar. 2, 1990.

* cited by examiner

Freezing Point vs PG Percentage of PG Plus EG

Figure 2. Predicted LD$_{50}$ Values for Mixtures of Ethylene Glycol and Propylene Glycol with Corrosion Inhibitors That Total a Constant Concentration of 1.5 Percent (by Weight).

Fig. 3. Predicted $LD_{50}$ Values for Mixtures of Ethylene Glycol and Propylene Glycol.

Figure 4. Predicted LD$_{50}$ Values for Mixtures of Ethylene Glycol and Glycerol.

Viscosity vs Temperature

Thermal Conductivity vs Temperature

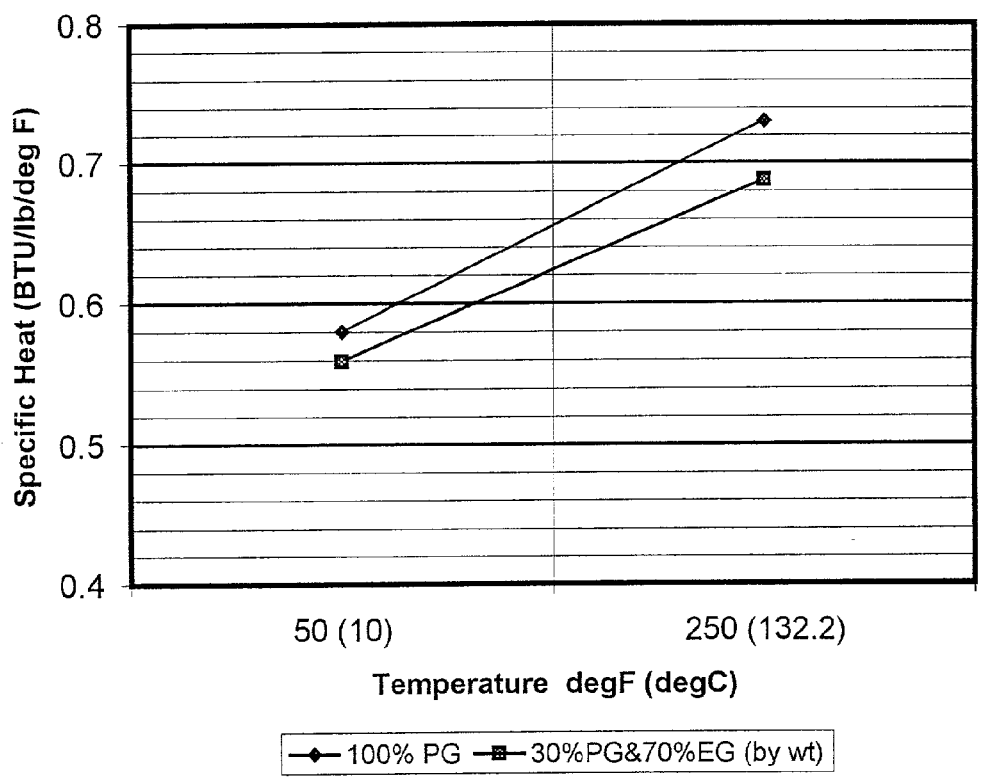

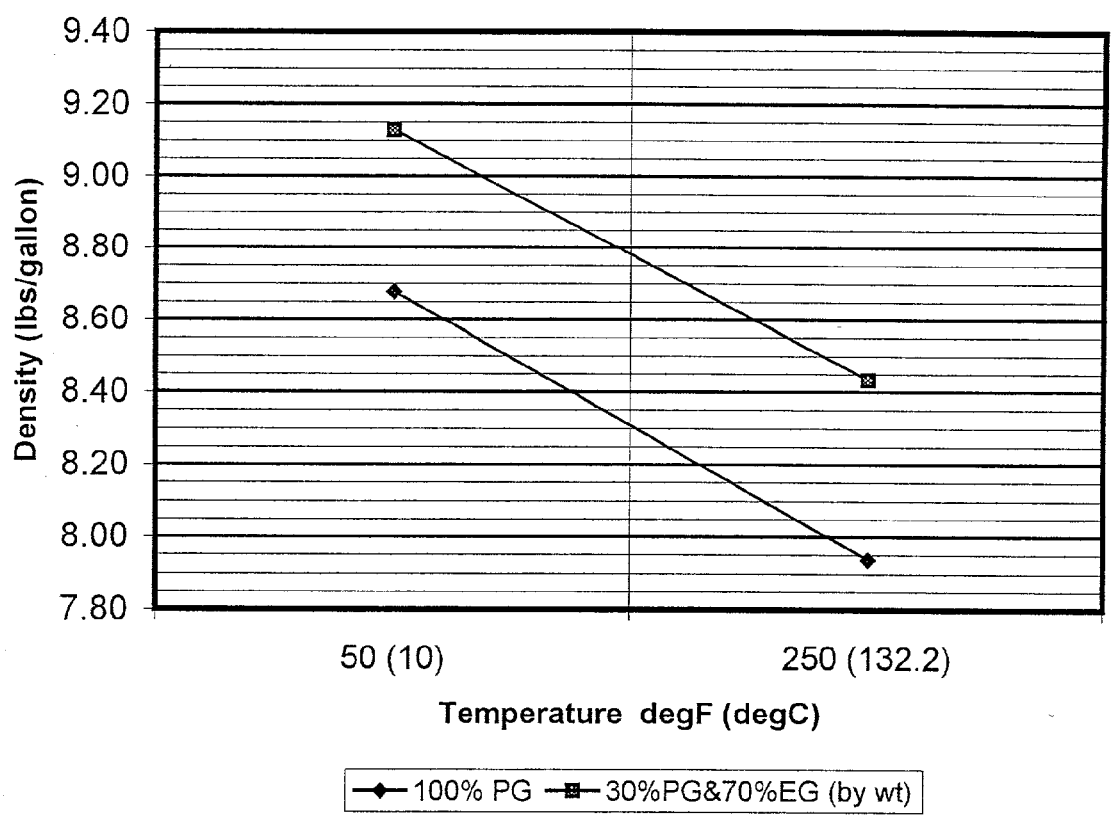

NON-AQUEOUS HEAT TRANSFER FLUID AND USE THEREOF

RELATED APPLICATIONS

The present application is a continuation-in-part of patent application U.S. Ser. No. 09/910,497 filed on Jul. 19, 2001.

FIELD OF THE INVENTION

The present invention relates generally to a substantially non-aqueous, reduced toxicity heat transfer fluid for use in heat exchange systems such as a coolant for internal combustion engines, a coolant for electrical or electronic components, a heat transfer fluid for solar energy heating systems, or a heat transfer fluid for maintaining temperatures in industrial processes. The present invention also relates to a compatible reduced toxicity preparation fluid for absorbing residual water from heat exchange systems in preparation for installing the non-aqueous heat transfer fluid.

BACKGROUND OF THE INVENTION

Heat transfer fluids are used in a variety of applications. One common use of heat transfer fluids is as a coolant in internal combustion engines. Most heat transfer fluids that are currently used contain water mixed with ethylene glycol (EG), a hazardous substance that can cause environmental contamination as a result of improper disposal. These fluids can cause dangerous health effects upon humans and other mammals if they are ingested. In addition, adverse health effects can occur due to exposure to used heat transfer fluids as a result of contamination by elemental heavy metal precipitates and toxic inhibitors that are added to prevent water related reactions.

Every year nearly 700 million gallons of heat transfer fluid concentrates are sold in the United States alone, and about 1.2 billion gallons are sold worldwide. Concentrates are formulations to which a substantial water fraction is added to form the actual heat transfer fluid. Much of the heat transfer fluid made from these concentrates replaces similar but spent heat transfer fluid drained from heat transfer systems such as automobile engine cooling systems. It is estimated that a significant percentage of the concentrates are disposed of improperly, resulting in contamination of the environment. Improper disposal by consumers is a major cause of this environmental contamination. Another major source of environmental contamination is leakage, spills and overflows from heavy duty vehicles. Experience with heavy duty vehicles shows that it is common to lose 10% of the engine heat transfer fluid volume after every 12,000 to 18,000 miles of operation due to leaks in the system components, such as the water pump, hose clamps or radiator core. This rate of loss is equal to about one gallon/month for the typical highway truck, which is the equivalent of a leakage rate of one drop per minute. A heat transfer fluid leak rate of one drop per minute is likely to go unnoticed, but can in total add up to a significant loss.

In some operations using heavy duty vehicles, overflows account for far more heat transfer fluid loss than low level leaks at the water pump, hose clamps or radiator core. Overflows occur due to overheating or when an engine cooling system is overfilled. When an engine cooling system is overfilled, operation of the engine heats the heat transfer fluid, causing expansion of the fluid that cannot be contained in the system. Pressure relief valve lines typically allow excess fluid to escape to the ground. Small spills and leaks (less than a gallon) of heat transfer fluid eventually will biodegrade with little impact to the environment. However, before biodegradation occurs, these spills and leaks can present a toxic danger to pets and wildlife.

Current engine coolant formulations typically utilize water as the primary heat removal fluid. The water content of an engine coolant is typically 30% to 70% by volume, depending upon the severity of the winter climate. The second major component of a conventional engine coolant is a freeze point depressant. The freeze point depressant most frequently used is EG, which is added to water in a range from 30% to 70% by volume of the engine coolant to prevent freezing of the water during winter. EG is a polyhydric alcohol, an alcohol with more than one hydroxyl (OH) group. Many polyhydric alcohols (such as, for example, diethylene glycol, triethylene glycol, tetraethylene glycol, propylene glycol, diapropylene glycol and hexylene glycol) when added to water depress the freezing point of the water and elevate the boiling point of the water. The most commonly used polyhydric alcohol in engine coolant formulations is EG because it has excellent characteristics for that purpose and because it is the least expensive of the polyhydric alcohols.

In addition to water and EG, an additive package containing several different chemicals is included. These additives are designed to prevent corrosion, cavitation, deposit formation and foaming, and are each present usually in concentrations of from 0.1% to 3% by weight of the coolant concentrate. The additives are typically mixed with the freeze point depressant to form an antifreeze concentrate, which can be blended with water to form the engine coolant. As an alternative to EG, a formulation composed of the polyhydric alcohol propylene glycol (PG) with additives has been used as a freeze point depressant, primarily due to PG's lower toxicity rating as compared to EG.

The same coolant formulations are not used for all engines because different engine types have different requirements. For example, heavy-duty engines require a high concentration of sodium nitrite as an additive to control iron erosion of cylinder liners due to cavitation. Cylinder liner cavitation can occur when a substantial portion of the engine coolant is made up of water. When, for example, a mixture of 50% water and 50% EG is used (50/50 EG/W) in a heavy duty engine, the operating temperature of the coolant (about 200° F., 93.3° C.) is fairly close to the boiling point of the coolant (about 250° F., 121.1° C. at 10 psig). Vibration of the cylinder liner creates a low pressure area during the part of the cycle when the liner moves away from the coolant and a high pressure area when the liner moves toward the coolant. During the low-pressure part of the cycle coolant becomes vaporized, only to immediately collapse back to liquid during the high pressure part of the vibration cycle. The repeated high frequency formation and collapse of coolant vapor attacks the surface of the liner, eroding small amounts of iron. Sodium nitrite is added to limit the amount of vapor impacting the cylinder wall. By comparison, the use of sodium nitrite is not necessary or desirable in light duty engines. The complexity of balancing various water to EG (or PG) ratios and different additive formulations can result in improper freeze protection and clogged radiators and heater cores when the engine coolant is misformulated. As discussed further below, many of these problems are a result of the need for a substantial water fraction in these engine coolants.

Another difference between heavy-duty engines and light duty automobile engines is the use of supplemental coolant additives in heavy duty engines to replenish additives that are depleted with service. Supplemental coolant additives are not used or required in passenger cars that have a coolant life of 20,000 miles (32,186 km) to 30,000 miles (48,279 km).

Heavy-duty service usually demands 200,000 miles (321,860 km) to 300,000 miles (482,790 km) before coolant replacement. The longer coolant service requirement results in the need to periodically replenish the inhibitors in heavy-duty engine coolants. Examples of commonly used supplemental coolant additives include sodium nitrite, dipotassium phosphate, sodium molybdate dihydrate, and phosphoric acid.

Supplemental coolant additives must be chemically balanced with the coolant volume, which can be difficult and costly to control properly. Improper balancing of additives can result in severe damage to cooling system components and the engine. If the concentration of the supplemental coolant additives in the coolant is too low, corrosion and cavitation damage to the engine and cooling system components can occur. If, on the other hand, the concentration of supplemental additives is too high, additives can precipitate from the coolant solution and clog radiator and heater cores. A further concern with supplemental coolant additives is that they may, under certain conditions, be difficult to properly dissolve in the engine coolant. If the supplemental additives do not completely dissolve, they may be a source of additional clogging problems in the engine.

Glycols make up 95% by weight of conventional antifreeze/coolant concentrates, and after blending with water, about 30% to 70% by volume of the coolant used in the vehicle. Because of its relative abundance and lower cost as compared with alternative glycols, conventional antifreezes are almost always formulated with EG. A major disadvantage of using EG as a freezing point depressant for engine coolants is its high toxicity to humans and other mammals if ingested. Toxicity is generally measured in accordance with a rating system known as the $LD_{50}$ rating system, which is the amount of a substance expressed in milligrams per kilogram of body mass that, when fed to laboratory rats in a single dose, will cause the death of 50 percent of the laboratory rats. A lower $LD_{50}$ value indicates a higher toxicity (i.e., smaller amounts of the substance can be lethal). An $LD_{50}$ value of less than or equal to 5,000 milligrams per kilogram of body mass (mg/kg) can classify an antifreeze concentrate as hazardous. Because EG has an $LD_{50}$ value of 4,700 mg/kg, EG is considered hazardous by this rating system. Moreover, EG is a known toxin to humans at relatively low levels.

The toxicity associated with EG is caused by the metabolites of EG, some of which are toxic. EG, when ingested, is metabolized by the alcohol dehydrogenase enzyme (ADH), converting it to glycoaldehyde. Glycoaldehyde further metabolizes to glycolic acid (glycolate). The accumulation of glycolic acid causes metabolic acidosis. Also, glycolic acid accumulation correlates with a decrease in arterial bicarbonate concentration. Some of the glycolic acid metabolizes to glyoxylic acid (glyoxylate), which further metabolizes to oxalic acid (oxylate). Oxalic acid binds to serum calcium in the bloodstream, and precipitates as crystals of calcium oxalate.

Characteristic symptoms observed with EG ingestion include anion gap metabolic acidosis, hypocalcemia, cardiac failure, and acute oliguric renal failure. Calcium oxylate crystals in many cases can be found throughout the body. Calcium oxylate crystals in the kidneys cause or are associated with the development of acute renal failure.

As reported in Toxic Release Inventory Reporting; Notice of Receipt of Petition, Federal Register, Vol. 63, No. 27, Feb. 10, 1998, the lethal dose of EG for a human is approximately 1,570 mg/kg body mass. Consequently, EG is classified by many regulatory authorities as a dangerous material. EG also has the added complication of a sweet smell and taste thereby creating an attraction for animals and children.

Due to the toxicity of EG, in recent years a base fluid concentrate with about 95% PG and additives has been used as a substitute for EG with additives in many antifreeze formulations. PG has an $LD_{50}$ value of 20,000 mg/kg as compared to EG's 4,700 mg/kg. PG is considered essentially non-toxic, and it has been approved by the U.S. Food and Drug Administration as a food additive. One impediment to more widespread usage of PG as a base fluid for antifreeze concentrates is its relatively high cost as compared to EG.

All conventional antifreeze concentrates, whether EG or PG based, contain water in their formulations. EG antifreeze concentrates require a small percentage of water in their formulation because EG, by itself and without any water, freezes at +7.7° F. (−13.5° C.). A small amount of water must be added to depress the freezing point. Addition of four percent water by volume to EG lowers the freezing point of the mixture to 3° F. (~19.4° C.). The freezing point of PG (by itself and without water) is relatively low, −76° F. (−60° C.). However, because some of the required additives are not readily soluble in either EG or PG, water is added to all conventional concentrate mixtures. Three to five percent by weight water is typically included in coolant concentrates to dissolve certain additives that will not dissolve in glycols. Added water is essential in conventional concentrates to keep the additives dissolved, particularly as the concentrates may be stored for extended periods.

Although three to five percent water is intentionally added to EG and PG concentrates to dissolve water soluble additives, addition of water alone is not effective over long periods of time to maintain the additives in solution. For long term storage, conventional coolant concentrates must be agitated periodically in order to keep the additives in solution until blending of the concentrate with water to make the final coolant mixture. If stored too long as a concentrate (over 6-8 months), one or more of the additives may precipitate from the solution and accumulate in the bottom of the container, forming a gel. The gelled additives will not return to solution, even with agitation. Even when mixed with water in an engine coolant, for example as 50/50 EG/water, the water soluble additives can form a gel if not agitated regularly by running the engine. This can be a severe problem for engines used in stationary emergency pumps and generators as well as military and other limited use engines.

The water added to concentrates to form an engine coolant can also cause formation of potentially hazardous products. Water at elevated temperatures can be highly reactive with the metal surfaces in a cooling system. The water can react with lead and copper materials from radiators, including brass and lead solder. As a result, precipitates of heavy metals, such as lead and copper, can become suspended in the circulating coolant in the engine. Water is also highly reactive with light alloys, such as aluminum, and the water fraction of the coolant can generate large amounts of aluminum precipitates, particularly at higher coolant temperatures. Even with the addition of additives to control these reactions, aluminum is constantly lost to the conventional engine coolants containing approximately 50/50 mixtures of EG and water.

Corrosion of metal surfaces in engine cooling systems using conventional glycol/water coolants is also caused by the formation of organic acids in the coolant, such as pyruvic acid, lactic acid, formic acid, and acetic acid. Polyhydric alcohols, such as EG or PG, in aqueous solutions can produce acidic oxidation products when in the presence of hot metal surfaces, oxygen from either entrapped air or water, vigorous aeration, and metal ions which catalyze the oxidation process. Moreover, formation of lactic acid and acetic acid is accelerated in coolant solutions at 200° F. (93.3° C.) or above while in the presence of copper. Formation of acetic acid is further accelerated in the presence of aluminum in coolant solutions at 200° F. (93.3° C.) or above. These acids can lower the pH of the coolant. Among the metals and alloys found in engine cooling systems, iron and steel are the most reactive to solutions containing organic acids, whereas light metals and alloys, such as aluminum, are considerably less reactive.

To counteract the effect of organic acids, conventional EG or PG based concentrates include buffers in their formulations. The buffers act to maintain the pH of the engine coolant in the range of approximately 10 to 11 as organic acids are formed. Some examples of typically utilized buffers include sodium tetraborate, sodium tetraborate decahydrate, sodium benzoate, phosphoric acid and sodium mercaptobenzothiazole. These buffers also require water in order to enter into and remain in solution. As the buffers in the coolant solution become depleted over time, the water fraction of the coolant reacts with the heat, air and metals of the engine, and, as a result, the pH decreases because of the acids that form.

In addition to buffers, all currently used and previously known engine coolants require inhibitors to control the corrosive effects from the water content of the coolant. The inhibitors must be balanced to avoid interactions with each other that would decrease their individual effectiveness. For example, phosphates and borates can decrease the corrosion protection provided to aluminum by silicates. Moreover, the inhibitors must not be used in excess concentration (in an attempt to extend the depletion time) because that can cause damage to system components due to precipitation resulting in plugging of radiator and heater core tubes. In addition, silicates, silicones, borates and phosphates are chemically abrasive and can erode heat exchanger tubes and pump impellers. Nevertheless, the inhibitors must still exist in a concentration adequate for protecting all of the metals.

All currently used coolant formulations require the addition of water to solubilize additives used as buffers, corrosion inhibitors and anti-foam agents. In addition, these water soluble additives require heat, extreme agitation, and extensive time for the water to react and cause the additives to dissolve. These requirements add significant cost and complexity to the formulation and packaging of antifreeze concentrates. The energy costs and time required for blending, before packaging, are a major factor in the processing costs. Also, because many of these additives may interfere with each other and cause an incomplete solution and failure of the formulation process, the formulating process must be monitored constantly to assure a proper blend.

Thus, the additive package that is included in known coolant concentrate formulations can consist of from 5 to 15, and typically from 8 to 15, different chemicals. These additives are broken down into major and minor categories, depending upon the amount used in an engine coolant formulation:

| MAJOR (0.05% to 3.0%) | MINOR (<0.05%) |
|---|---|
| Buffer | Defoamer |
| Corrosion inhibitors | Dye |
| Cavitation inhibitors | Scale inhibitor |
|  | Surfactant |
|  | Chelates |

In addition, some of the additives themselves, e.g., borates, phosphates, and nitrites, are considered toxic. Thus, not only do all known coolant concentrate formulations include additives that require heat, extreme agitation and extensive time for the water to react and cause the additives to dissolve, but the additives themselves are sometimes toxic. Further, the additives require complex balancing which accommodates the prevention of interference between the additives, while also preventing the excessive presence of any one additive in the coolant.

The applicant has a co-pending application U.S. Ser. No. 08/991,155 filed on Dec. 17, 1997, which is continuation-in-part of patent application U.S. Ser. No. 08/409,026 filed on Mar. 23, 1995, the contents of each of which are expressly incorporated herein by reference.

Accordingly, it is an object of the present invention to overcome one or more of the drawbacks and disadvantages of the prior art and provide a reduced toxicity, non-aqueous heat transfer fluid.

SUMMARY OF THE INVENTION

The present invention relates to a heat transfer fluid that uses polyhydric alcohols, preferably propylene glycol (PG) or a mixture of (PG and EG), as its base fluid without the addition of water and is therefore termed non-aqueous. The use of water in the non-aqueous heat transfer fluid is not required as a means to dissolve additives because the only additives used are corrosion inhibitors that are soluble in neat PG and EG. By avoiding corrosion inhibitors that require water for dissolution, the formulation of the present invention is easier to blend and requires much less time to blend, thereby lowering blending costs. The instant invention, of a water-free polyhydric alcohol-based heat transfer fluid (preferably PG or PG with EG), utilizes a unique formulating process which results in a fully-formulated and stabilized, non-aqueous heat transfer fluid suitable for use as an engine coolant.

In a second aspect of the present invention, EG based non-aqueous heat transfer fluids are provided that are non-toxic. The inventors have discovered that PG acts as an ADH enzyme inhibitor, slowing or preventing the metabolism of EG into the toxic metabolites related with EG poisoning, and that when PG is mixed with EG, the resulting mixture is essentially non-toxic even up to EG proportions of 99 percent by weight. The inventors have discovered that the polyhydric alcohol glycerol also acts as an ADH enzyme inhibitor, and that when glycerol is mixed with EG the resulting mixture is likewise essentially non-toxic.

One advantage of the present invention is that all resulting non-aqueous heat transfer -fluids are suitable for use as engine coolants in ambient temperatures up to 130° F. (54.4° C.) or hotter and, depending on the selection of the polyhydric alcohols, a non-aqueous heat transfer fluid can be blended for use as an engine coolant in ambient temperatures as cold as −76° F. (−60° C.).

Another advantage of the present invention is that, when the non-aqueous heat transfer fluid is used in a cooling systems such as those disclosed in U.S. Pat. Nos. 4,550,694; 5,031,579; 5,381,762; 5,385,123; 5,419,287; 5,868,105 and 6,053,132, and even in cooling systems designed for use with water-based coolants, the cooling system can operate at a significantly lower pressure, thereby reducing stress on engine system components. The lubricous nature of the non-aqueous coolant of the present invention is benign to rubber, and allows the pump seals, hoses and system components to normally last 150,000 miles (241,395 km) or more, which dramatically lowers the loss of coolant to the environment because of leaks, while also decreasing overheating.

A further advantage of the present invention is that the corrosion inhibitor additives will remain dissolved, without agitation, for many years of storage. Another advantage is that non-aqueous coolants according to this invention will not cause cylinder liner cavitation and therefore there is no need for separate formulations for heavy-duty engines. Sodium nitrite, for example, does not need to be added to provide protection from cylinder liner cavitation erosion.

Yet another advantage of the present invention is that the lack of water in the fully-formulated non-aqueous heat transfer fluids according to this invention substantially reduces, and in most instances eliminates, the problem of contamination from precipitates of heavy metals, such as lead and copper. Also, because pH (acidity) is not a concern with the non-aqueous formulated coolant of the present invention there is no need for additives such as borates and phosphates.

Another advantage of the present invention is that the essentially water-free nature of the coolant formulation eliminates other water, air, heat and metal-based reactions and eliminates the need for additives to control these reactions. The reactions and additives that are eliminated include:

1. Anti-foam reactions/Silicones and polyglycol additives,
2. Aluminum corrosion/Silicates,
3. Cavitation corrosion/Nitrites,
4. Scale inhibitors/Polyacrylates, and
5. Anti-fouling/Detergents.

Another advantage of the present invention is the creation of non-aqueous, low-toxicity heat transfer fluids that are suitable for use in heat exchange systems for the cooling of electrical or electronic components. Yet another advantage of the present invention is the creation of non-aqueous, low-toxicity heat transfer fluids that are suitable for use in heat exchange systems for the conversion of solar energy to usable heat. When using the low-toxicity heat transfer fluids of the present invention in a solar energy conversion application, use of heat exchangers with special double walls, to prevent contamination from the heat transfer fluid, is not required.

The non-aqueous heat transfer fluid of the present invention may be prepared by two different methods. In a first method, the additives are mixed with and dissolved in a quantity of the polyhydric alcohol base fluid, such as PG or PG and EG, to form an additive/base fluid concentrate. After complete solution of the additives is achieved, the concentrated solution is blended into the bulk tank which is filled with industrial grade PG or PG and EG. In a second method, the additives are introduced in powder form directly into the bulk blending tank, which is filled with industrial grade PG or PG and EG. Either of these methods is easier and less costly than the methods presently used to mix heat transfer concentrates for use in engines with water.

The present invention also provides for a compatible reduced toxicity preparation fluid for absorbing residual water from heat exchange systems in preparation for installing the non-aqueous heat transfer fluid. The preparation fluid is comprised of EG and PG, with EG being the major fraction and the PG acting as an ADH enzyme inhibitor. The preparation fluid is particularly useful when a previous water-based heat transfer fluid is being replaced with a heat transfer fluid of the present invention.

Other advantages of the compositions and methods of the present invention will become more readily apparent in view of the accompanying detailed description of the invention.

BRIEF DESCRIPTION OF THE DRAWINGS

So that those having ordinary skill in the art to which the subject invention appertains will more readily understand the subject invention, reference may be had to the drawings, wherein:

FIG. 7 is a graph showing Specific Heat vs. Temperature for 100% PG and a 30% PG/70% EG blend by weight.

FIG. 8 is a graph showing Density vs. Temperature for 100% PG and a 30% PG/70% EG blend by weight.

DETAILED DESCRIPTION OF THE PREFERRED EMBODIMENT

Figure 1:
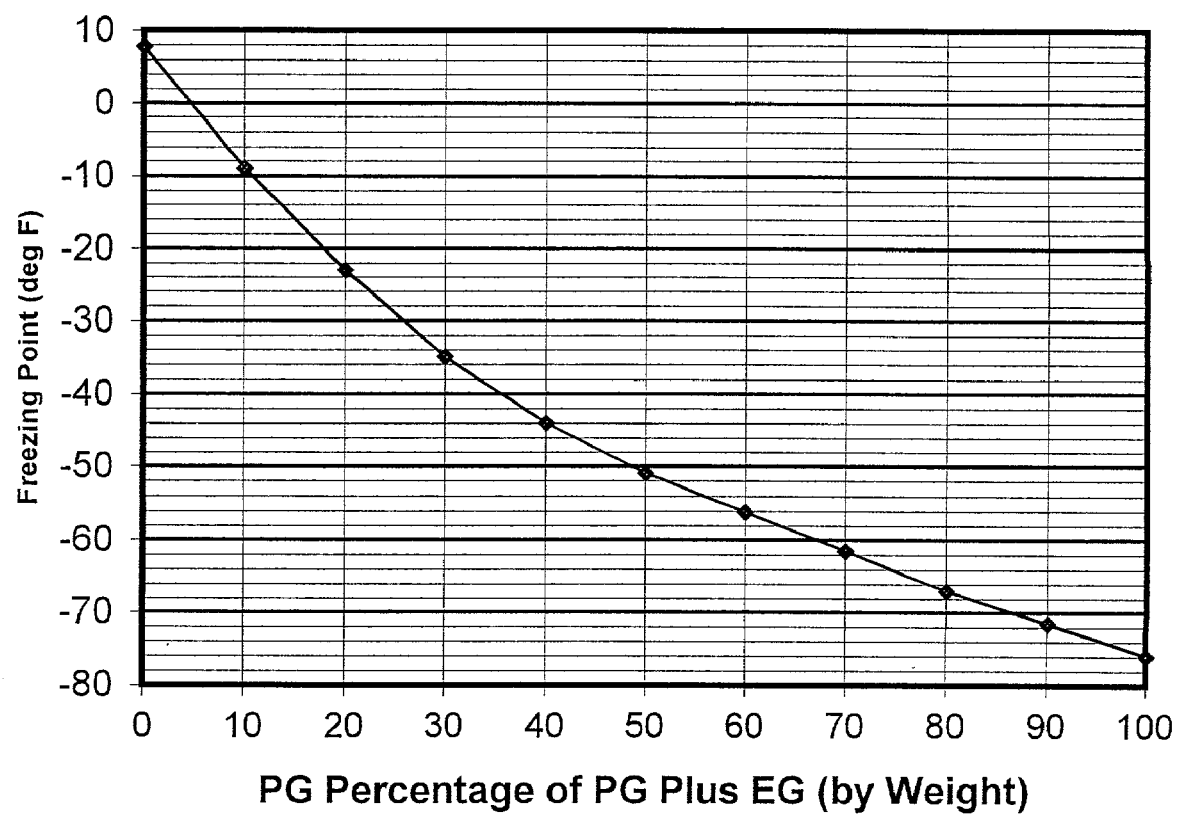
FIG. 1 is a graph showing the Freezing Point vs. PG Percentage by weight of PG and EG blends.

The present invention relates to a polyhydric alcohol-based non-aqueous heat transfer fluid containing additives that are essentially completely soluble in the polyhydric alcohols and that do not require water to dissolve. The polyhydric alcohol fraction of the non-aqueous heat transfer fluid contains at least one polyhydric alcohol that acts as an ADH enzyme inhibitor. As used herein and in the claims, the term "acts as an ADH enzyme inhibitor" means that when the substance is mixed with EG and ingested, the various toxic metabolites of EG that relate to EG poisoning do not appear or the production of them is substantially diminished. EG requires the action of metabolism to produce the toxic products that result in EG poisoning. The first step in the metabolism of EG is the conversion of EG to glycoaldehyde, followed by further metabolism that results in highly toxic metabolites. By including a substance that acts as an ADH enzyme inhibitor in the EG-based heat transfer fluid, production of the toxic metabolites of EG can be reduced or prevented altogether if the heat transfer fluid is ingested. The inventors have discovered that both PG and glycerol act as ADH enzyme inhibitors.

Preferably, the polyhydric alcohol fraction is comprised of either PG or a mixture of PG and EG. Preferred embodiments of the invention are described below. The preferred embodiments disclosed herein are to be considered exemplary of the principles of the present invention and are not intended to limit the invention to the embodiments described. Various modifications will be apparent to those skilled in the art based on the teachings herein without departing from the spirit or scope of the invention disclosed herein.

In one embodiment of the invention, a mixture of PG and EG is used as the base liquid for the non-aqueous heat transfer fluid. The non-aqueous heat transfer fluid may contain EG in any amount ranging between 0 percent by weight to about 99 percent by weight of the total weight of EG and PG in the fluid. In a particularly preferred embodiment, EG comprises about 70 percent by weight and PG comprises about 30 percent by weight of the total weight of EG and PG in the fluid. By blending PG and EG in the manner described below, a non-aqueous heat transfer fluid can be produced with desirable physical properties for use as an engine coolant in most climates, such as freezing point, viscosity and specific heat. Physical Properties of Mixtures of PG and EG PG and EG are very close in chemical structure, and the two fluids will combine to form a homogeneous mixture in virtually any ratio. After they are combined, the fluids remain chemically stable, and neither fluid will separate from the other. The result is a fluid that will remain stable as blended, which is important for long-term storage.

Another advantage of mixing PG and EG in a non-aqueous heat transfer fluid is that, when mixed, EG and PG will evaporate at about the same rate. This is a result of another similar physical characteristic of the two fluids, their vapor pressures. EG has a vapor pressure at 200° F. (93.3° C.) of 10 mm Hg, and PG at the same temperature has the relatively similar vapor pressure of 16 mm Hg. Accordingly, the two fluids will evaporate at about the same rate. By contrast, water has a vapor pressure of 600 mm Hg at 200° F., and therefore water will evaporate more rapidly than either EG or PG when exposed to the ambient atmosphere.

Neat PG freezes at −76° F. (−60° C.) and neat EG freezes at 7.7° F. (−13.5° C.). The freezing point for mixtures of EG and PG rises as the percentage of EG is increased. In contrast, PG is substantially more viscous than EG at lower temperatures. However, for mixtures of PG and EG, it was discovered that viscosity at any given temperature decreased as the percentage of EG increased.

Figure 5:
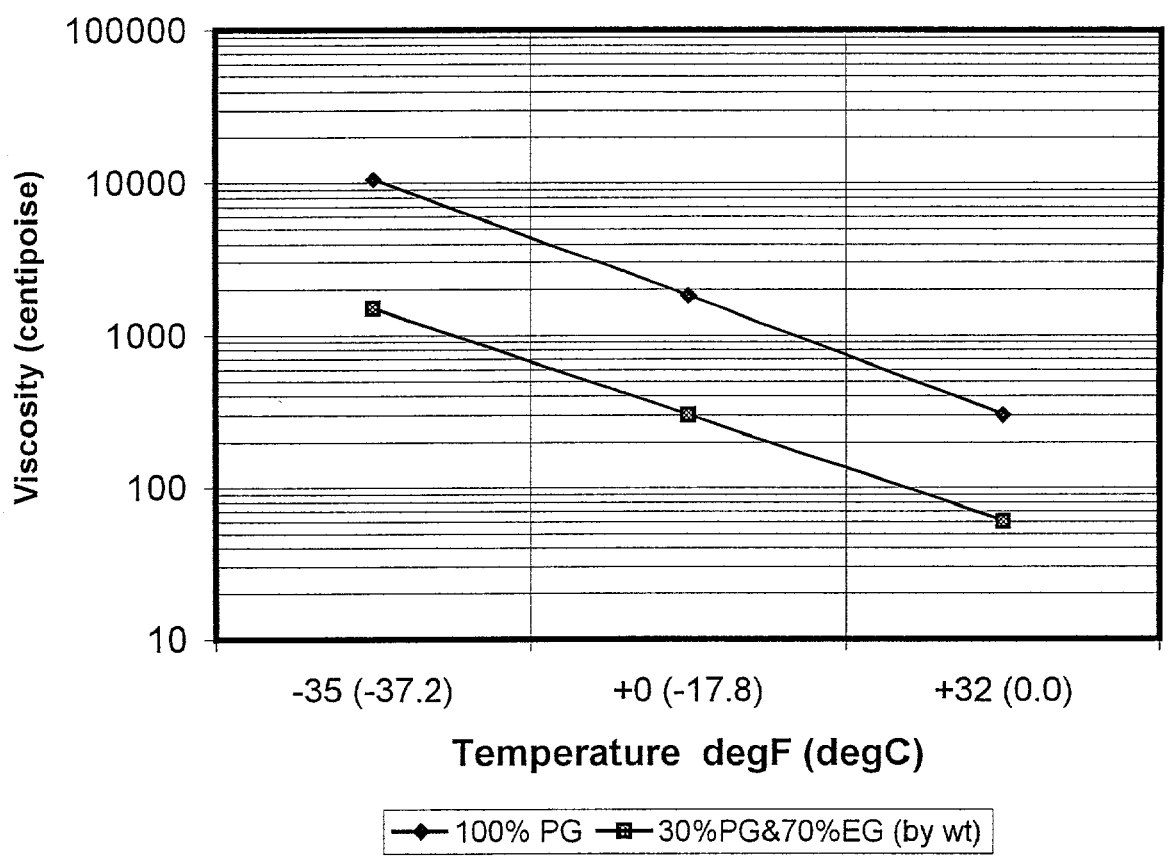
FIG. 5 is a graph showing Viscosity vs. Temperature for 100% PG and a 30% PG/70% EG blend by weight.

In a preferred embodiment of the heat transfer fluid containing a 30/70 PG/EG mixture, the freezing point is −35° F. (−37.2° C.), which is satisfactory for all but the most severe arctic environments. As shown in FIG. 5, unexpected improvements in the viscosity of the heat transfer fluid occur when EG is mixed with PG. The viscosity of the 30/70 PG/EG mixture at −35° F.
(−37.2° C.) is approximately 1500 centipoise (cp), as compared to a viscosity of approximately 110,000 cp for neat PG at this temperature. In order to accommodate the higher viscosity in embodiments where PG alone is used as the base non-aqueous heat transfer fluid in the coolant, changes to the size of coolant passages of the system apparatus and to flow rates would likely be necessary. In the embodiment of the invention comprised of 30/70 PG/EG by weight, the viscosity at low temperatures will allow use of the non-aqueous heat transfer fluid without changes to coolant passage sizes or flow rates. The 30/70 PG/EG non-aqueous heat transfer fluid and engine coolant has been tested in engine coolant systems which were cold ambient limited and had historically required radiator, heater core, and pump redesign when operating at cold temperatures with 100% non-aqueous PG. The 30/70 PG/EG non-aqueous fluid was found to operate properly at ambient temperatures down to −20° F. (−28.8° C.) without any need for radiator, heater core or pump redesign.

Because of the high temperatures that can exist in an engine, the boiling point, thermal conductivity and specific heat of the base liquid is also an important factor in formulating a non-aqueous heat transfer fluid for use as an engine coolant. At atmospheric pressure, PG has a boiling point of 369° F. (187.2° C.), which is satisfactory for use as an engine coolant. The boiling point of EG at atmospheric pressure is 387° F. (197.3° C.), which is also satisfactory. The acceptable upper limit for the atmospheric boiling point of a non-aqueous heat transfer fluid used as an engine coolant is about 410° F. (about 210° C.). If the atmospheric boiling point is significantly higher than 410° F., the coolant and critical engine metal temperatures can become too hot. Many polyhydric alcohols have boiling points that are unacceptably high for use, by themselves, as non-aqueous coolants. For example, the boiling points of diethylene glycol, triethylene glycol and tripropylene glycol are 472.6° F. (244.8° C.), 545.9° F. (285.5° C.) and 514.4° F. (268° C.) respectively. Although these polyhydric alcohols, by themselves, are unacceptable as non-aqueous coolants, any of them may, in low concentrations (for example about 10 percent by weight), be combined with EG and/or PG to produce a non-aqueous heat transfer fluid with an acceptable boiling point. Preferably, the non-aqueous heat transfer fluid of the present invention contains only PG and EG. PG and EG mixtures have boiling points that fall between the boiling points for neat PG and neat EG, all of which are satisfactory for a non-aqueous engine coolant. For example, the preferred 30/70 PG/EG mixture has a boiling point of 375° F. (190.5° C.).

The polyhydric alcohols that are in the heat transfer fluid formulation must not have boiling points that are too low. Performance of the fluid depends upon maintaining a substantial temperature difference between the operating temperature of the fluid and the boiling point of the fluid (on the order of 100° F., 55.6° C., or more). Also, the boiling point of the polyhydric alcohol that is the ADH enzyme inhibitor should not be too far below the boiling point of EG (387° F., 197.3° C.) such that the vapor pressure of the inhibitor would cause it to evaporate from the mixture. For both of these reasons, the polyhydric alcohols should not have boiling points below about 302° F. (150° C.).

Figure 6:
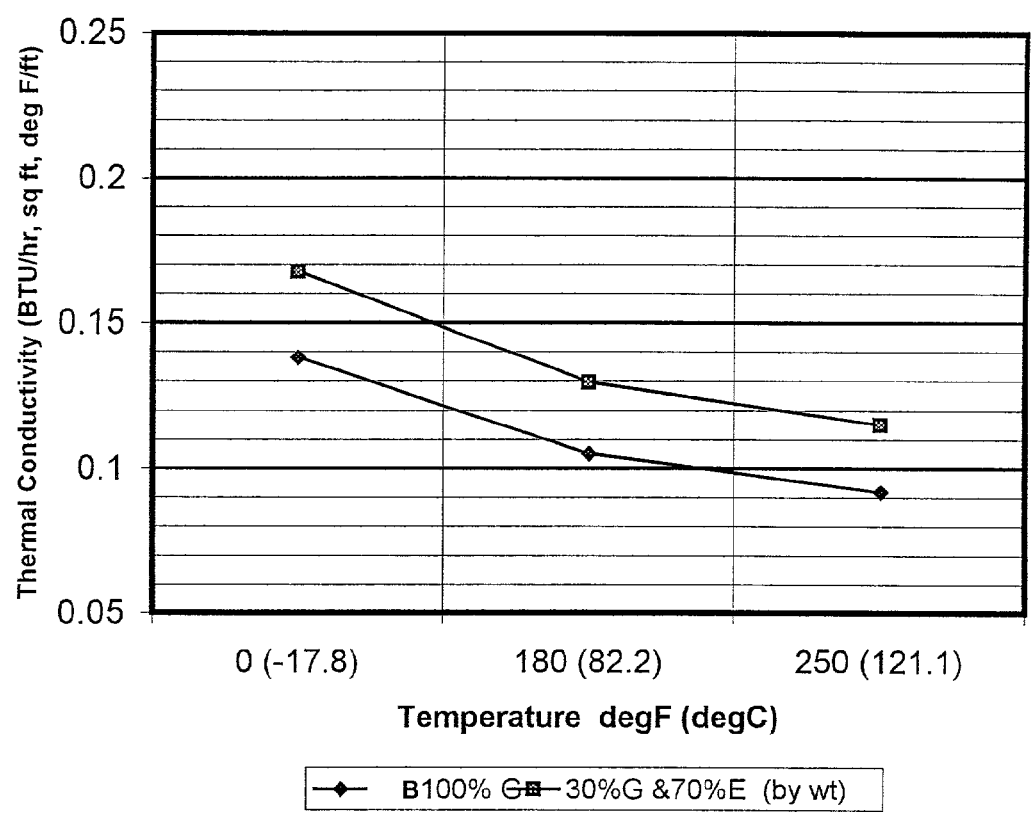
FIG. 6 is a graph showing Thermal Conductivity vs. Temperature for 100% PG and a 30% PG/70% EG blend by weight.

The thermal conductivity of a non-aqueous heat transfer fluid composed of 30/70 PG/EG is also improved over the thermal conductivity of pure PG. FIG. 6 compares the thermal conductivity of 100% non-aqueous PG to the thermal conductivity of a 30/70 PG/EG mixture. As shown in FIG. 6, the 30/70 PG/EG mixture has a thermal conductivity that is approximately 25% better than the thermal conductivity of 100% PG in the operating temperature range of 0° F. (−17.8° C.) to 250° F. (121.1° C.).

FIG. 7 shows that the specific heat of a 30/70 PG/EG mixture is slightly less than the specific heat of 100% PG. This loss is offset as a result of the increased density of the 30/70 PG/EG mixture over 100% PG. As shown in FIG. 8, the density of 30/70 PG/EG mixtures is about 5% greater than the density of 100% PG, and the resultant increase in mass of the 30/70 PG/EG blend for a given volume of heat transfer fluid more than offsets the slight decrease in specific heat.

Toxicity Testing of EG Combined with PG

In an unexpected discovery, it was found that the addition of PG to EG resulted in heat transfer fluids that are essentially non-toxic. Limit tests and range tests were conducted in order to estimate the final $LD_{50}$ value of PG/EG mixtures. A limit test establishes whether or not an $LD_{50}$ value lies above or below a specific dose. A range test is a series of limit tests that establishes a range within which an $LD_{50}$ value lies. Before any testing is performed on rats using a mixture of substances that have established $LD_{50}$ values, a mathematical estimate of the $LD_{50}$ value is performed.

Ingesting less of a toxic substance decreases its toxic impact. Accordingly, when a mixture of a toxic substance and a non-toxic substance is ingested, in which the concentration of the toxic substance is reduced, more of the mixture must be ingested to produce the same toxic effect as the pure substance. For example, EG by itself has an acute oral (rat) $LD_{50}$ value of 4,700 mg/kg. If the EG is mixed with a substance that is completely non-toxic such that the mixture is ½EG, the acute oral (rat) $LD_{50}$ value of the mixture would be estimated to be 9,400 mg/kg, or twice that of EG by itself. This is a reasonable estimate since the same quantity of the mixture would contain only ½ the amount of EG.

PG has an acute oral (rat) $LD_{50}$ value of 20,000 mg/kg. As described in the World Health Organization Classification of Pesticides by Hazard and Guidelines to Classification 1998-99, the $LD_{50}$ of a mixture containing substances having known $LD_{50}$ values can be estimated by the following formula:

$$C_A/T_A + C_B/T_B + \ldots + C_Z/T_Z = 100/T_{Mxtr}$$

Where:
- C = the % concentration of constituents A, B ..., Z in the mixture.
- T = the acute oral (rat) $LD_{50}$ values of the constituents A, B ..., Z.
- $T_{Mxtr}$ = the estimated acute oral (rat) $LD_{50}$ value of the mixture.

Using the above equation, the predicted acute oral (rat) $LD_{50}$ values of various mixtures of EG with PG and inhibitors were calculated. The results of the calculations are shown graphically in FIG. 2.

Acute oral toxicity tests were performed to determine the toxicity of mixtures of PG and EG of the present invention. The tests were conducted by a laboratory certified by the United States Environmental Protection Agency (EPA) using standard "GLP" test procedures as described in United States Food and Drug Administration Regulations, 21 C.F.R. Part 58 and EPA Good Laboratory Practice Standards, 40 C.F.R. Part 792. As described below, the results of this testing unexpectedly showed that the mixtures of PG and EG were substantially less toxic than was predicted based upon the standard toxicity calculation for mixtures.

Figure 2:
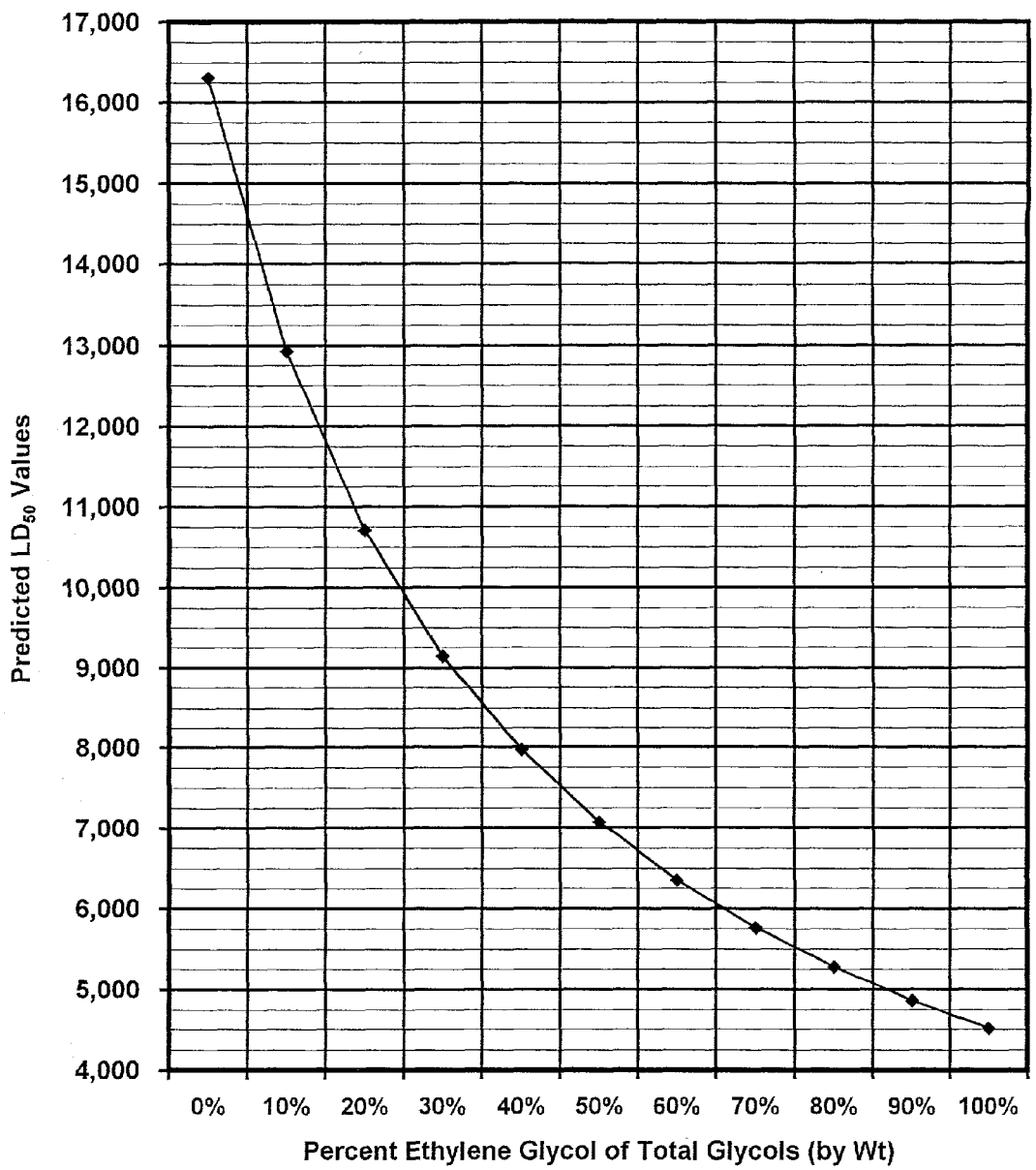
FIG. 2 is a graph showing Predicted $LD_{50}$ Values for Mixtures of Ethylene Glycol and Propylene Glycol with Corrosion Inhibitors That Total a Constant Concentration of 1.5 Percent (by Weight).

A formulation tested was comprised of 68.95 percent by weight EG, 29.55 percent by weight PG, and corrosion inhibitors totaling 1.5 percent by weight. The fraction of PG in the mixture as compared to the total of the polyhydric alcohols was 30 percent and the fraction of EG was 70 percent. Referring to FIG. 2, the predicted $LD_{50}$ value for this formulation is 5,762 mg/kg, which is about 23 percent greater than EG's $LD_{50}$ value of 4,700 mg/kg. A range test was conducted in which the rats were given up to maximum possible doses of approximately 21,000 mg/kg (an amount that completely filled the rats' stomachs). No rat deaths were reported, and all of the rats actually gained a significant amount of weight during the test period.

This result was completely unexpected as the toxicity of the test formulation was so low (despite the substantial concentration of EG) that it was impossible to determine an $LD_{50}$ value; i.e., there is no $LD_{50}$ value for this formulation. As PG does have an $LD_{50}$ value (half of PG rats die with a dose of 20,000 mg/kg), the tested non-aqueous coolant formulated according to the invention is actually less toxic than PG itself.

Figure 3:
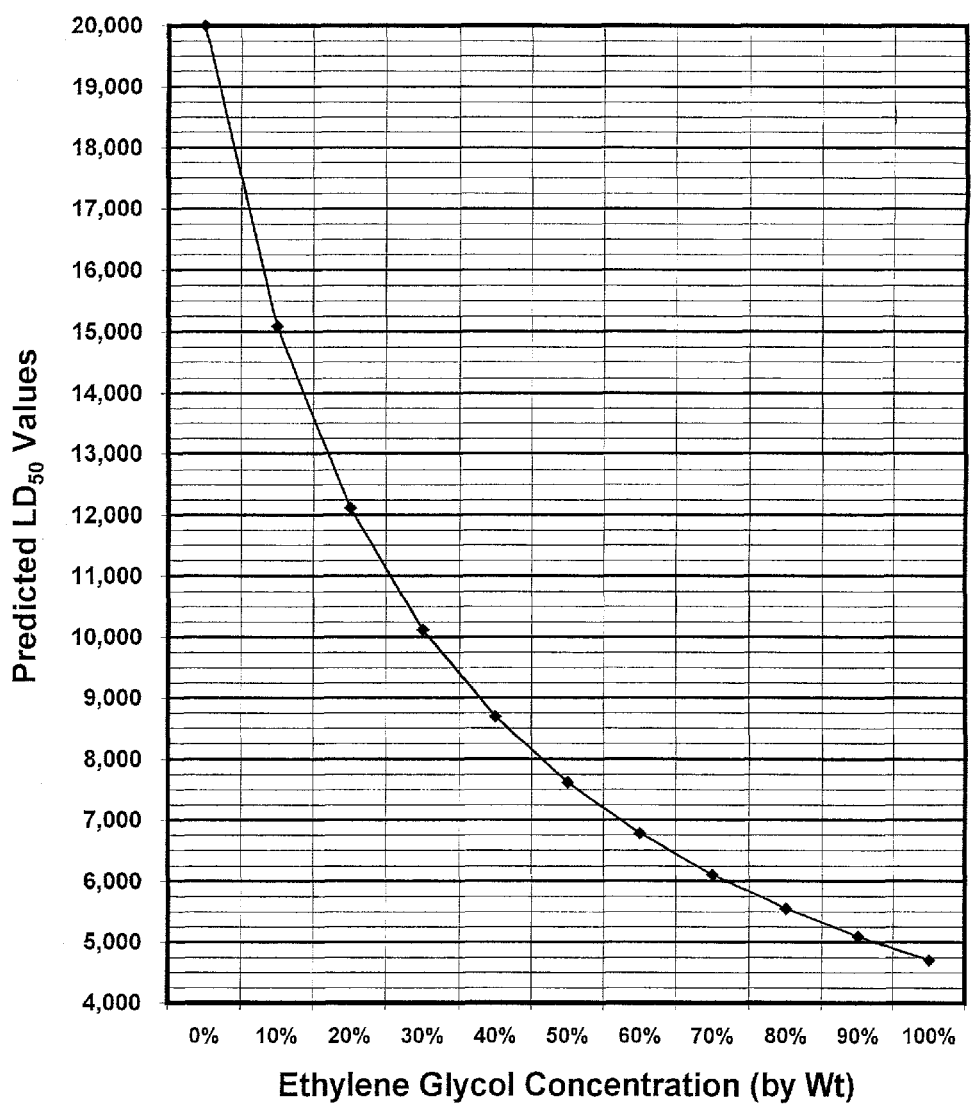
FIG. 3 is a graph showing Predicted $LD_{50}$ Values for Mixtures of Ethylene Glycol and Propylene Glycol (by Weight).

A range test was performed using a formulation comprised of 95 percent by weight EG and 5 percent by weight PG. Referring to FIG. 3, the predicted $LD_{50}$ value of this formulation is 4,904 mg/kg, only 4 percent greater than EG's $LD_{50}$ value of 4,700 mg/kg. In the range test there were no mortalities at 5,000 and 10,000 mg/kg doses, all of the rats died at 20,000 and 25,000 mg/kg doses and one of the two rats died at the 15,000 gm/kg dose level. The test performed indicates that the $LD_{50}$ value is somewhere near 15,000 mg/kg, a value that demonstrates that the fluid is of very low toxicity.

The results of the toxicity tests of the EG and PG mixtures were as astounding as they were unexpected. Without being limited to any particular theory, the inventors currently believe that PG is an ADH enzyme inhibitor. By incorporating PG into an EG formulation, it appears that the conversion of EG into glycoaldehyde is significantly reduced or prevented altogether from the time of ingestion. Without the formation of glycoaldehyde, the further toxic metabolites of glycolic acid, glyoxylic acid, and oxalic acid are not created. Acidosis, precipitation of calcium oxylate crystals, hypocalcemia, renal failure, and all the other characteristics of EG poisoning do not occur. The inhibition provided by the PG remains until the EG is expelled from the body.

The significance of the discovery that even small amounts of PG mixed with EG render the mixture non-hazardous is that much larger percentages of EG than heretofore thought prudent can be incorporated into PG and EG non-aqueous coolants without causing toxicity problems.

Limit tests at 5,000 mg/kg were performed on mixtures where the PG and EG percentages of total polyhydric alcohols were 10%/90%, 5%/95%, 4%/96%, 3%/97%, 2%/98%, and 1%/99%. In every case, no rats died. Recall that the $LD_{50}$ value for EG itself is 4,700 mg/kg, indicating that at that dosage half of test rats die. At 5,000 mg/kg doses for all of the rats in the above six studies, none of the rats died. The significance of this fact is that a non-aqueous coolant formulated with EG being 95% by weight of the total polyhydric alcohols in the coolant still has the capacity to have EG added to it without the coolant becoming toxic.

Toxicity Testing of EG Combined with Glycerol

Figure 4:
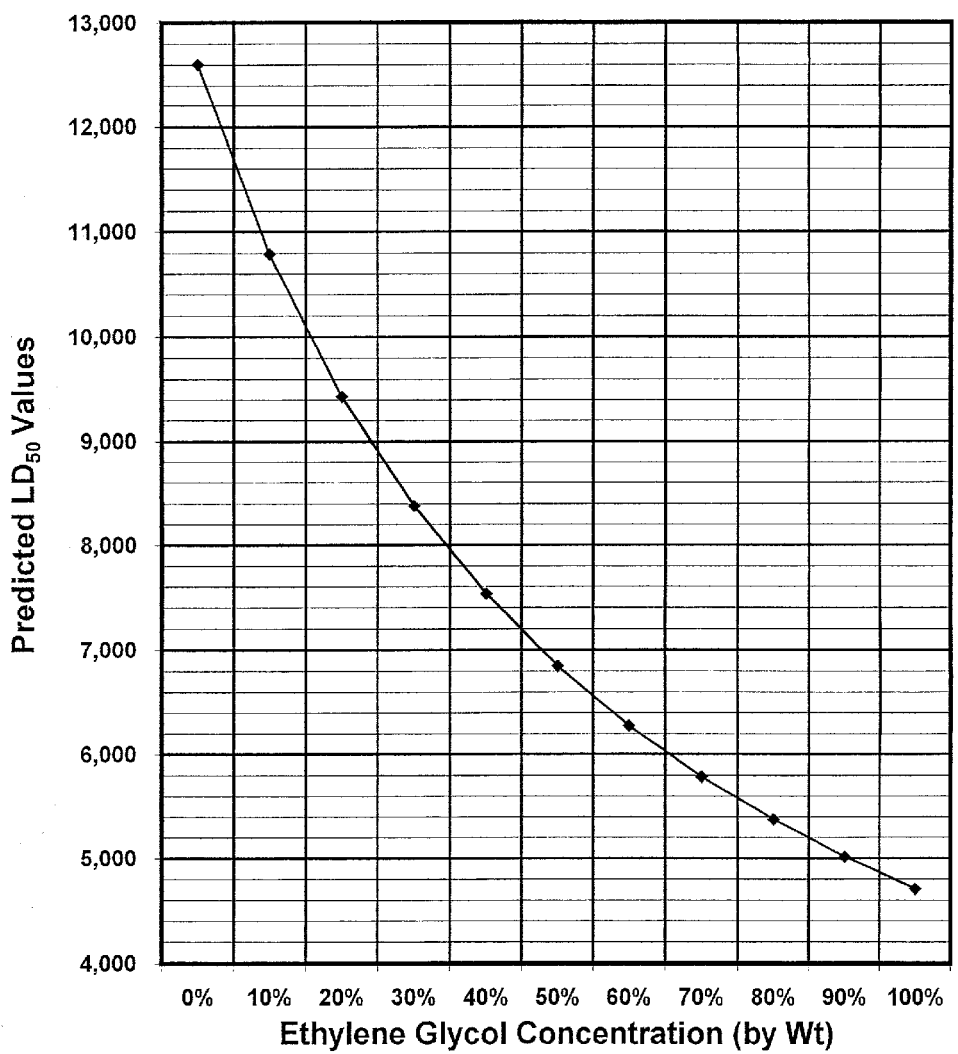
FIG. 4 is a graph showing Predicted $LD_{50}$ Values for Mixtures of Ethylene Glycol and Glycerol (by Weight).

A limit test was performed for a mixture of glycerol and EG wherein the percentage of glycerol was 20% by weight and the percentage of EG was 80% by weight. Referring to FIG. 4, the predicted $LD_{50}$ value for this formulation is 5,374 mg/kg, or 14 percent greater than EG's $LD_{50}$ value of 4,700 mg/kg. The limit test was performed at a dosage of 8,000 mg/kg. One rat died but that rat appeared to be anomalous as all of the remaining 9 rats survived, experiencing weight gains of between 21% and 53% over the two-week test period.

A range test was performed using a formulation comprised of 95 percent by weight EG and 5 percent by weight glycerol. Referring to FIG. 4, the predicted $LD_{50}$ value of this formulation is 4,852 mg/kg, only 3 percent greater than EG's $LD_{50}$ value of 4,700 mg/kg. In the range test there were no mortalities at 5,000 and 10,000 mg/kg doses, all of the rats died at 20,000 and 25,000 mg/kg doses, and one of the two rats died at the 15,000 gm/kg dose level (exactly the same result as the similar test using 95% EG and 5% PG). The test performed indicates that the $LD_{50}$ value for the 95%/5% EG/glycerol mixture is somewhere near 15,000 mg/kg, a value that demonstrates that the fluid is of very low toxicity. Thus it was discovered that glycerol renders mixtures of EG that contain glycerol, even in small concentrations, very low in toxicity. The inventors currently believe that glycerol is as effective as PG in acting as an ADH enzyme inhibitor.

Glycerol, a polyhydric alcohol with three hydroxyl groups (boiling point 554° F., 290° C.), is not considered by the inventors to be superior to PG as a heat transfer fluid ingredient, however. Glycerol is, for example, more costly and more viscous than PG and has a freezing point that is too high for low temperature applications. It can, however, be satisfactorily used in concentrations of from 1% to 10% of the weight of the EG plus glycerol in a heat transfer fluid for toxicity reduction in situations where low temperatures are not encountered. Glycerol can also be mixed with PG and the mixture blended with EG. For most applications mixtures of EG with PG would be preferred to mixtures of EG with glycerol.

Whether EG is blended with PG or glycerol, the mixture will remain "safe" in all stored, or in use conditions, due to the high saturation temperatures and low vapor pressures of EG, PG, and glycerol base fluids. Fluid entering the environment from draining or from leaks or other unintentional discharges from an engine cooling system using a coolant according to this invention will retain the approximate ratio of the polyhydric alcohols in the blended concentrate and will thereby be essentially non-hazardous to the environment. In addition, if EG were inadvertently added to a non-aqueous heat transfer fluid of the present invention, the resulting mixture would be reduced in toxicity, from the EG added, far beyond the reduction predicted by dilution alone and would most likely be essentially non-hazardous to the environment. Also, other polyhydric alcohols may be present, in low concentrations, in mixtures of PG or glycerol with EG without altering the essentially non-hazardous characteristics of the non-aqueous heat transfer fluid.

Corrosion Inhibitor Additives

The non-aqueous heat transfer fluid of the present invention utilizes only additives that are soluble in PG and in EG, or in glycerol and EG, and thus does not require water for the additives to enter into or remain in solution. In addition to being soluble in EG and PG or in EG and glycerol, each chosen additive is a corrosion inhibitor for one or more specific metals that may be present in an engine. A nitrate compound, such as sodium nitrate, is utilized as an additive to inhibit corrosion for iron or alloys containing iron, such as cast iron. Although the primary function of sodium nitrate is to prevent corrosion of iron, it also slightly inhibits solder and aluminum corrosion. An azole compound, such as tolyltriazole, functions as a corrosion-inhibiting additive for both copper and brass. A molybdate compound, such as sodium molybdate, primarily functions as a corrosion inhibitor for lead (from solder), but is also beneficial in decreasing corrosion for many other metals. Notably, there is no need for nitrites in any formulation of the non-aqueous heat transfer fluid.

The choice of PG, and EG-soluble additives thus depends on which metals are of concern with regard to corrosion of metal surfaces. Typically, sodium nitrate, tolyltriazole and sodium molybdate would be added to formulate a universally usable heat transfer fluid because iron, solder, aluminum, copper and/or brass are often used in engine cooling system components. However, an additive could be reduced or eliminated if the particular metal it acts on is eliminated. For example, if lead-based solder is eliminated, then the content of sodium molybdate could be reduced, or it might not be required at all.

The corrosion inhibitor additives may be present in a range from a concentration of about 0.05% by weight to about 5.0% by weight of the formulated heat transfer fluid, and are preferably present at a concentration of less than 3.0% by weight. Solutions below about 0.1% by weight are not as effective for long life inhibition, while solutions over about 5.0% may result in precipitation of the additive. In a preferred embodiment, each corrosion inhibitor additive is present in a concentration of about 0.3% to about 0.5% by weight depending upon the service life of the coolant. Another advantage of the present invention is that light alloys will have little or no corrosion in PG or PG and EG non-aqueous fluids. Accordingly, metals such as magnesium and aluminum will exhibit little or no corrosion, and additives to limit corrosion of these metals can be eliminated.

The use of sodium nitrate, tolyltriazole and sodium molybdate as corrosion inhibitor additives has many advantages. For example, these additives are not rapidly depleted in service, and therefore the engine coolant may be formulated to last for heretofore unobtainable service periods, without change or additive replenishment, of up to about 10,000 hours or 400,000 miles (643,720 km) in many forms of engines and vehicles. Another advantage of these PG or PG and EG soluble additives is that the additives go into solution or suspension readily and remain in solution or suspension, even in extreme concentrations. These additives will not precipitate from the solutions even when each additive is present in concentrations of up to 5.0 percent by weight. Moreover, these additives will not degrade significantly as a result of interactions with each other, the additives are not abrasive, and the additives and coolant protect all metals, including magnesium, for the same operating period.

The non-aqueous PG or PG and EG soluble additives of the present invention do not become depleted over extended hourly usage or mileage and thus the need for supplemental coolant additives is ordinarily eliminated. Nevertheless, if it should become desirable to add supplemental coolant additives, the non-aqueous formulation exhibits advantages because the supplemental coolant additives will more readily enter stable solution or suspension with the present invention than in aqueous coolants. Moreover, the proper balance of supplemental coolant additives is easier to maintain, with a broad possible range of concentrations from about 0.05% by weight to about 5.0% by weight.

Should the supplemental addition of additives be required, the supplements may be added in either dry powder form, or as a dissolved concentrate directly to the cooling system. The supplements may be added to a cool engine (50° F. or above) and will dissolve into solution merely by idling the engine, without clogging the radiator or heater cores. Also, because the preferred target base solution for each additive is about 0.5% by weight and the saturated limit is about 5.0%, there is little chance of inadvertent addition of an unacceptable amount of supplemental additive. By contrast, current water-based additives must be added to a hot coolant, then run hard (to enter solution) and are easily oversaturated, which can cause radiator and heater damage.

As used herein and in the claims, "non-aqueous" means that water is present only as an impurity in the non-aqueous heat transfer fluid preferably, in no greater than a starting concentration of about 0.5% by weight. Most preferably, the non-aqueous heat transfer fluid contains virtually no water. Although an increase in water is not desired during use, the present invention can accommodate the presence of some water. Because PG is a hygroscopic substance, water can enter the coolant from the atmosphere, or water can escape from the combustion chamber into the coolant from a combustion gasket leak into the cooling chamber. Although the essence of the invention is to avoid water, the invention will permit some water as an impurity; however, the water fraction of the coolant in use is preferably restricted to below about 5.0% by weight, and more preferably, to below about 3.0% by weight. Further, the invention and related cooling systems can tolerate water, from absorption during use, up to a maximum concentration of about 10% by weight and retain reasonably acceptable operating characteristics.

Because the heat transfer fluid of the present invention does not contain substantial amounts of water, several of the problems associated with aqueous heat transfer fluids are eliminated. For example, aqueous coolants can form violent vapor bubbles (cavitation) in the cooling system leading to lead and copper erosion from the effects of the vapor/gases and the reaction of water with the metals. Because the present invention is non-aqueous in nature, coolant vapor bubbles are substantially minimized and water vapor bubbles are essentially eliminated, thereby reducing the quantity of heavy metal precipitates in the coolant.

In conventional water-based coolants, acidity of the coolant is a concern. If the coolant is acidic, corrosion of metal surfaces may be increased. To avoid acidic conditions, conventional water-based coolants require buffering agents to make the coolant more basic (an increase in the pH to 10 to 14). At least about 5% of the content of conventional anti-freeze concentrates must be water in order to dissolve these buffers (e.g. phosphates, borates, carbonates, and the like). The non-aqueous heat transfer fluid of the present invention does not require buffering because acid anhydrides that are present would require the presence of water to form acids. Without the water, the non-aqueous coolant does not become corrosive and no buffers are needed.

A preferred embodiment of the non-aqueous heat transfer fluid is compared to the formulation of a conventional coolant below:

| Components: | | A. Preferred Embodiment | B. Conventional Coolant (EG Antifreeze Concentrate Plus Water) |
|---|---|---|---|
| 1) Polyhydric Alcohol | | | |
| a. PG or PG/EG Mixture | wt. % | >98.4 | — |
| b. Ethylene Glycol | wt. % | — | 46.75 |
| 2) Water | wt. % | <0.1 | 50.83 |
| 3) Tolyltriazole | wt. % | 0.5 | 0.10 |
| 4) Sodium Nitrate | wt. % | 0.5 | 0.05 |
| 5) Sodium Molybdate | wt. % | 0.5 | 0.05 |
| 6) Sodium Metaborate | wt. % | — | 0.50 |
| 7) Sodium Hydroxide | wt. % | — | 0.12 |
| 8) Sodium Benzoate | wt. % | — | 1.50 |
| 9) Sodium Nitrite | wt. % | — | 0.05 |
| 10) Sodium Metasilicate | wt. % | — | 0.10 |

The respective percentage weights of PG and EG in the PG/EG mixture are normally set for the smallest proportion of PG that will achieve the freezing point protection required; see FIG. 1. For a freezing point of −35° F. (−37.2° C.), for example, the percentage of PG in the mixture of the polyhydric alcohols is 30 percent (by weight) and that for EG is 70 percent. As the total percentage by weight of the mixture is >98.4%, the percentage of the fully formulated coolant, by weight, that is PG would be 29.5%. The figure for the EG would be 68.9%. The remainder of the formulation is corrosion inhibitors and possibly a trace amount of water present only as an impurity.

Corrosion Testing Using Embodiments of the Invention

EXAMPLE 1

This corrosion test was performed using the test procedure set forth in ASTM #D-1384 (Modified). Six specimens, typical of metals present in an engine coolant system, were totally immersed in the test coolants contained in glassware. Coolant "A" was a non-aqueous heat transfer fluid of the present invention in which the polyhydric alcohol portion was 100 percent PG. Coolant "B" was a conventional engine coolant formulation comprised of an EG based antifreeze concentrate mixed with water.

In the ASTM test procedure, the coolant is aerated by bubbling air up through the glassware, and maintained at a test temperature of 190° F. (88° C.) for 336 hours. This procedure was modified to more accurately reflect the conditions that would be experienced by the metals in an engine coolant system in use. The tests were conducted at a control temperature of 215° F. (101.6° C.) to simulate severe duty use. Coolant "A" was tested without aeration being applied in order to more closely approximate its operation in a non-aqueous engine cooling system, such as, for example, the engine cooling system described in U.S. Pat. Nos. 4,550,694; 4,630,572; and 5,031,579; 5,381,762; 5,385,123; 5,419,287; 5,868,105 and 6,053,132. The conventional antifreeze composition in Coolant "B" was aerated in the normal manner of the ASTM #D-1384 test. At the completion of the test, corrosion was measured by weight loss of each metal specimen. The results of the test were as follows:

1) Light Alloy Engines—Aluminum or Magnesium Head and Block

| METAL | Δ WT (mg) COOLANT "A" | Δ WT (mg) COOLANT "B" | ASTM STD. |
|---|---|---|---|
| Magnesium | −1.3 | >−1,000 | −50 |
| Aluminum | +0.3 | −21.1 | −30 |
| Steel | −0.5 | −3.9 | −10 |
| Copper | −3.7 | −7.4 | −10 |
| Solder | −9.0 | −19.2 | −30 |
| Brass | −0.6 | −5.1 | −10 |

2) Combined Alloy Engines—Aluminum [partial] with iron, or all iron

| METAL | Δ WT (mg) COOLANT "A" | Δ WT (mg) COOLANT "B" | ASTM STD. |
|---|---|---|---|
| Cast Iron | +1.0 | −6.2 | −10 |
| Aluminum | +2.0 | −18.6 | −30 |
| Steel | 0.0 | −4.3 | −10 |
| Copper | −3.0 | −8.9 | −10 |
| Solder | −6.1 | −19.7 | −30 |
| Brass | 0.0 | −4.7 | −10 |

The results with a positive gain in weight occur because of plating out of transients from the other specimens used in the test, and those metals that gained the transient weight virtually did not lose any weight due to corrosion themselves.

EXAMPLE 2

This corrosion test was conducted to determine the amount of corrosion of cast aluminum or magnesium alloys in engine coolants under heat rejecting conditions. A cast aluminum alloy specimen, typical of that used for engine cylinder heads or blocks, was exposed to test engine coolant solutions. Coolant "A" was a non-aqueous coolant of the present invention with 100 percent PG. To simulate the operating conditions of a coolant system using a non-aqueous coolant, the test using Coolant "A" was conducted at a temperature of 275° F. (135° C.) and a pressure of 2 psig (13.79 kPa), which is slightly above ambient pressure. Test Coolant "B" contained an ASTM prescribed corrosive water used to make up the water fraction of a 50/50 EG/water coolant. The test conditions for Coolant B, which simulate the conditions in an aqueous coolant engine cooling system, were a temperature of 275° F. (135° C.) and a pressure of 28 psig (193 kPa).

In each test, a heat flux was established through the specimen, and the test specimens were maintained under the test conditions for 168 hours (one week). The corrosion of the test specimens was measured by the weight change of the specimen in milligrams. The test provided an evaluation of the coolant solution's ability to inhibit aluminum, as well as magnesium, corrosion at a heat-rejecting surface. The results of this test were as follows:

| METAL | Δ WT (mg) COOLANT "A" | Δ WT (mg) COOLANT "B" | ASTM STD. |
|---|---|---|---|
| Aluminum | 0.067 | 1.61 | <2 |
| Magnesium | 0.18 | 5.79 | <2 |

EXAMPLE 3

Field Test

A 3.8L V-6 engine was operated over the road for a test period of 55,000 miles (88,511.5 km). The engine cooling system in the vehicle was configured as described in U.S. Pat. No. 5,031,579. Coolant "A" was identical to the non-aqueous coolant described in Example 1 above. There was no draining or replacing of the coolant during the test period. A metal specimen bundle was placed within the full flow of the engine coolant stream (lower hose) and was kept submerged in the coolant at all times. Performance of the test coolant's ability to inhibit metal corrosion was evaluated by comparing the results in milligrams lost of the specimen at the end of the test period to ASTM test standards. The results were as follows:

| METAL | Δ WT (mg) COOLANT "A" | ASTM STD. |
|---|---|---|
| Cast Iron | −2.8 | −10 |
| Aluminum | +0.2 | −30 |
| Steel | −1.1 | −10 |
| Copper | −1.3 | −10 |
| Solder | −3.7 | −30 |
| Brass | −0.9 | −10 |
| pH at start | +7.1 | NA |
| pH at finish | +6.9 | NA |

Method of Manufacture

The non-aqueous heat transfer fluid of the present invention may be manufactured by the methods described below. The non-aqueous heat transfer fluid may be made in a batch process. Initially, calculations must be performed to determine the required quantity for the ingredients. For example, the following calculations would be performed to determine the quantity of each ingredient to mix 6,500 gallons of non-aqueous heat transfer fluid:

1. Determine the approximate weight of 6,500 gallons of the final product.
    a. From the desired percentage (by weight) of PG ($\%_{PG}$) in the polyhydric alcohol portion of the formulated coolant (a figure in the range of 1% to 100%), compute the density (lbs. per gallon) of the mixed polyhydric alcohols according to the following formula:
    $D_{mixed\ PA} = 100/((\%_{PG}/8.637)+((100-\%_{PG})/9.281))$
    b. The estimated weight in pounds for 6,500 gallons:

$EstWt_{6500} = D_{mixed\ PA} \times 6,500$

2. Compute the weights for each component of the non-aqueous heat transfer fluid to be added to the batch:
    a. Each of the three additives is 0.5 percent of the total weight.
        1. The tolyltriazole will weigh $0.005 \times EstWt_{6500}$.
        2. The sodium nitrate will weigh $0.005 \times EstWt_{6500}$.
        3. The sodium molybdate will weigh $0.005 \times EstWt_{6500}$.
    b. The weight of the total polyhydric alcohols ($Wt_{TotPA}$) will be $(1-0.015) \times EstWt_{6500}$.
    c. The PG will weigh $\%_{PG} \times WtTotPA/100$ lbs.
    d. The EG will weigh $(100-\%_{PG}) \times Wt_{TotPA}/100$ lbs.

After the quantity of each component has been calculated, the non-aqueous heat transfer fluid may be mixed together using a variety of methods. For example, the additives may be pre-mixed with a portion of the polyhydric alcohol(s) that will be used in the main body of the non-aqueous heat transfer fluid. In one embodiment of the present invention in which the polyhydric alcohol portion of the coolant is entirely PG and the quantity to be produced is 6,500 gallons, this method would be performed using at least the following steps:
1. Provide 3,300 lbs. of industrial grade PG in an additive tank and add the following inhibitors:

| a. tolyltriazole | 281 lbs. |
|---|---|
| b. sodium nitrate | 281 lbs. |
| c. sodium molybdate | 281 lbs. |

2. Blend for 20 min at a room temperature of 60° to 70° F. using a standard paddle or propeller, or air agitation.
3. Provide 52,000 lbs. of industrial grade PG in a 6,500 gallon or larger main tank.
4. Add the contents of the additive tank to the main tank.
5. Blend the contents of the main tank for 30 min at a room temperature of 60° to 70° F. using a standard paddle or propeller, or air agitation.

In an embodiment of the invention in which the heat transfer fluid is comprised of 30 percent PG by weight and 70 percent EG by weight, the method of manufacturing the heat transfer fluid by pre-mixing additives with a polyhydric alcohol may be as follows:
1. Provide 3,300 lbs. of industrial grade EG in an empty additive tank and add the following inhibitors:

| a. tolyltriazole | 295 lbs. |
|---|---|
| b. sodium nitrate | 295 lbs. |
| c. sodium molybdate | 295 lbs. |

2. Blend for 20 min at a room temperature of 60° to 70° F. using a standard paddle or propeller, or air agitation.
3. Provide 17,435 lbs. of industrial grade PG in an empty 6,500 gallon or larger main tank.
4. Add 37,385 lbs. of industrial grade EG to the main tank.
5. Add the contents of the additive tank to the main tank.
6. Blend the contents of the main tank for 30 minutes at a room temperature of 60° to 70° F. using a standard paddle or propeller, or air agitation.

In an another method for producing the heat transfer fluid, the additives may be mixed directly into the polyhydric alcohol(s), and the pre-mixing steps may be eliminated. For a heat transfer fluid comprised of 100 percent PG, this method of is performed using at least the following steps:
1. Provide 55,300 lbs. of industrial grade PG in a 6,500 gallon or larger main tank and add the following inhibitors:

| a. tolyltriazole | 281 lbs. |
|---|---|
| b. sodium nitrate | 281 lbs. |
| c. sodium molybdate | 281 lbs. |

2. Blend for 1.5 hours at a room temperature of 60° to 70° F. using a standard paddle or propeller, or air agitation.

This method may also be used to produce heat transfer fluids comprised of mixtures of PG and EG. For example, for a heat transfer fluid comprised of 30 percent PG by weight and 70 percent EG by weight, at least the following steps would be performed:
1. Provide 17,435 lbs. of industrial grade PG in an empty 6,500 gallon or larger main tank.

2. Add 40,685 lbs. of industrial grade EG to the main tank.
3. Add the following inhibitors to the main tank:

| | |
|---|---|
| a. tolyltriazole | 295 lbs. |
| b. sodium nitrate | 295 lbs. |
| c. sodium molybdate | 295 lbs. |

4. Blend for 1.5 hours at a room temperature of 60° to 70° F. using a standard paddle or propeller, or air agitation.

Either of the methods described above will result in a stable fully-formulated non-aqueous heat transfer fluid in a period of time that may be as little as 1/6 of the time typically required to properly formulate conventional EG or PG antifreeze coolant concentrates.

In a further embodiment of the present invention, a preparation fluid for the absorption of water from heat exchange systems is provided that is especially useful when converting from a water-based heat transfer fluid to a heat transfer fluid of the present invention. The preparation fluid is installed in a heat exchange system temporarily and drained prior to installation of the non-aqueous heat transfer fluid described above. The preparation fluid is comprised of EG and a polyhydric alcohol that acts as an ADH enzyme inhibitor, preferably PG, to reduce the toxicity of the EG. As the preparation fluid is used in the heat exchange system only temporarily, corrosion inhibitors typically are not required, although corrosion inhibitors may be included if desired. The preparation fluid absorbs water from the heat exchange system. The preparation fluid may be used for multiple applications until it has become saturated with water, at which time it is disposed of or recycled to remove the absorbed water. The concentration of PG in the preparation fluid is typically between about 1% to about 50% of the total weight of EG and PG in the fluid. In a preferred embodiment, the concentration of PG is about 5% of the total weight of EG and PG in the fluid.

As will be recognized by those of ordinary skill in the art based on the teachings herein, numerous changes and modifications may be made to the above-described embodiments of the present invention without departing from its spirit or scope. Accordingly, the detailed description of preferred embodiments is to be taken in an illustrative rather than a limiting sense.

We claim:

1. A method for producing an ethylene glycol based non-aqueous heat transfer fluid having a reduced oral toxicity comprising the steps of:
   (a) providing a non-aqueous heat transfer fluid comprising ethylene glycol;
   (b) mixing a sufficient amount of non-aqueous propylene glycol with the non-aqueous heat transfer fluid comprising ethylene glycol to achieve a concentration of the propylene glycol that is between about 5 percent and 30 percent of the weight of the ethylene glycol and the propylene glycol in the resulting heat transfer fluid, wherein the resulting fluid is less toxic than 10,000 mg/kg on the basis of an acute $LD_{50}$ oral toxicity in rats; and
   (c) adding at least one corrosion inhibiting additive, wherein the corrosion inhibiting additive is soluble in both ethylene glycol and propylene glycol, wherein the resulting heat transfer fluid contains no additive that requires water in the heat transfer fluid to dissolve the additive or to enable the additive to function and wherein the resulting non-aqueous heat transfer fluid contains less than 0.5% by weight water.

2. The method of claim 1, wherein the propylene glycol comprises between about 5 percent by weight and 10 percent by weight of the weight of the ethylene glycol and the propylene glycol in the heat transfer fluid.

3. The method of claim , wherein the at least one corrosion inhibiting additive is selected from the group consisting of a molybdate salt, a nitrate salt and an azole.

4. The method of claim 3, wherein the molybdate salt is sodium molybdate.

5. The method of claim 3, wherein the nitrate salt is sodium nitrate.

6. The method of claim 3, wherein the azole is tolytriazole.

7. The method of claim 1, further comprising the step of adding to the heat transfer fluid at least one of (i) sodium molybdate in a concentration of between about 0.05 percent by weight to about 5 percent by weight of the total weight of the fluid, (ii) sodium nitrate in a concentration of between about 0.05 percent by weight to about 5 percent by weight of the total weight of the fluid, or (iii) tolytriazole in a concentration of between about 0.05 percent by weight to about 5 percent by weight of the total weight of the fluid.

* * * * *

UNITED STATES PATENT AND TRADEMARK OFFICE
CERTIFICATE OF CORRECTION

PATENT NO. : 8,394,287 B2  
APPLICATION NO. : 09/935982  
DATED : March 12, 2013  
INVENTOR(S) : John W. Evans and J. Thomas Light Page 1 of 1

It is certified that error appears in the above-identified patent and that said Letters Patent is hereby corrected as shown below:

In the Claims

Col. 20, Claim 3, line 1 after the word claim, insert --1--.

Signed and Sealed this  
Eleventh Day of June, 2013

Teresa Stanek Rea  
*Acting Director of the United States Patent and Trademark Office*

UNITED STATES PATENT AND TRADEMARK OFFICE
CERTIFICATE OF CORRECTION

PATENT NO.         : 8,394,287 B2
APPLICATION NO.    : 09/935982
DATED              : March 12, 2013
INVENTOR(S)        : John W. Evans and J. Thomas Light It is certified that error appears in the above-identified patent and that said Letters Patent is hereby corrected as shown below:

In the Claims

Column 20, line 27 (Claim 3, line 1) after the word claim, insert --1--.

This certificate supersedes the Certificate of Correction issued June 11, 2013.

Signed and Sealed this
Second Day of July, 2013

Teresa Stanek Rea
*Acting Director of the United States Patent and Trademark Office*